(12) United States Patent
Iyer et al.

(10) Patent No.: US 8,060,425 B2
(45) Date of Patent: Nov. 15, 2011

(54) EVALUATION AND ADJUSTMENT OF SETTLEMENT VALUE CURVES

(75) Inventors: Suneel Iyer, Naperville, IL (US); Moody Hadi, Chicago, IL (US); Ketan Patel, Hanover Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 282 days.

(21) Appl. No.: 12/329,228

(22) Filed: Dec. 5, 2008

(65) Prior Publication Data
US 2010/0145841 A1 Jun. 10, 2010

(51) Int. Cl.
*G06Q 40/00* (2006.01)
(52) U.S. Cl. ........................................................ 705/35
(58) Field of Classification Search ............... 705/35–38
See application file for complete search history.

(56) References Cited

U.S. PATENT DOCUMENTS

| | | | |
|---|---|---|---|
| 6,304,858 B1 * | 10/2001 | Mosler et al. ................... | 705/37 |
| 2002/0010670 A1 * | 1/2002 | Mosler et al. ................... | 705/37 |
| 2003/0236738 A1 | 12/2003 | Lange et al. | |
| 2007/0239589 A1 * | 10/2007 | Wilson et al. ................... | 705/37 |
| 2007/0288351 A1 | 12/2007 | Huntley | |
| 2007/0294156 A1 | 12/2007 | Hughes et al. | |
| 2008/0167981 A1 | 7/2008 | Whitehurst et al. | |
| 2008/0183615 A1 | 7/2008 | Rio et al. | |
| 2008/0275807 A1 | 11/2008 | Weingard | |

OTHER PUBLICATIONS

Assessing Specification Errors in Stochastic Discount Factor Models, Hansen. L.P., Jagannathan, R., The Journal of Finane (52) 2 (Jun. 1997), pp. 557-590.*
International Search Report from PCT/US09/66707 dated Jan. 29, 2010, 2 pages.

* cited by examiner

*Primary Examiner* — Charles Kyle
*Assistant Examiner* — Linda Perry
(74) *Attorney, Agent, or Firm* — Banner & Witcoff Ltd.

(57) ABSTRACT

Disclosed is a method that is useful in connection with providing discount factors for an exchange-traded mark-to-market derivative product that has a variable tick rate, such as an interest rate swap product. In some embodiments, the method includes providing a series of consecutive settlement values, which collectively represent a settlement value curve for the derivative product. The curve is evaluated by determining, for each consecutive pair of settlement values, whether the difference between the first settlement value in the pair and the second settlement value in the pair exceeds a threshold. The threshold represents the value at which a discount factor derived from said pair of settlement values, in conjunction with other parameters, would be negative. In other embodiments the disclosed invention encompasses an apparatus and a computer-readable medium.

29 Claims, 5 Drawing Sheets

| Contracts | Settlements | IMM Discount Factor |
|---|---|---|
| 20 year | 4.4760% | 0.425645498746 |
| 20.5 year | 5.0120% | 0.348068493424 |
| 21 year | 5.0120% | 0.339144582446 |
| 21.5 year | 5.0130% | 0.330947940194 |
| 22 year | 5.0130% | 0.322461322493 |
| 22.5 year | 5.0000% | 0.316224892218 |
| 23 year | 5.0000% | 0.308428505008 |
| 23.5 year | 5.0000% | 0.300824334334 |
| 24 year | 5.0000% | 0.293407641182 |
| 24.5 year | 2.5210% | 0.635634930186 |
| 25 year | 7.2150% | 0.041291929911 |
| 25.5 year | 4.9670% | 0.276210724533 |
| 26 year | 4.9670% | 0.269444713306 |
| 26.5 year | 2.5000% | 0.624403737538 |
| 27 year | 2.5000% | 0.616314608304 |
| 27.5 year | 4.9790% | 0.230227863144 |
| 28 year | 4.9790% | 0.224412543652 |
| 28.5 year | 5.0000% | 0.215668919376 |
| 29 year | 5.0000% | 0.210371470478 |
| 29.5 year | 4.9670% | 0.210300213358 |
| 30 year | 4.3290% | 0.305060647006 |

| Contracts | Settlements | IMM Discount Factor |
|---|---|---|
| 20 year | 4.4760% | 0.425645498746 |
| 20.5 year | 5.0120% | 0.348068493842 |
| 21 year | 5.0120% | 0.339144582444 |
| 21.5 year | 5.0130% | 0.330947940194 |
| 22 year | 5.0130% | 0.322461322493 |
| 22.5 year | 5.0000% | 0.316224892218 |
| 23 year | 5.0000% | 0.308428505008 |
| 23.5 year | 5.0000% | 0.300824334334 |
| 24 year | 5.0000% | 0.293407641182 |
| 24.5 year | 2.5210% | 0.635634930186 |
| 25 year | 6.9189% | 0.000000000000 |
| 25.5 year | 4.9670% | 0.275199244394 |
| 26 year | 4.9670% | 0.268458010214 |
| 26.5 year | 2.5000% | 0.623913306740 |
| 27 year | 2.5000% | 0.615830531020 |
| 27.5 year | 4.9790% | 0.229373725981 |
| 28 year | 4.9790% | 0.223495216885 |
| 28.5 year | 5.0000% | 0.214790709652 |
| 29 year | 5.0000% | 0.209495138105 |
| 29.5 year | 4.9670% | 0.209452909812 |
| 30 year | 4.3290% | 0.304336355603 |

EVALUATION AND ADJUSTMENT OF SETTLEMENT VALUE CURVES

FIELD OF INVENTION

The invention relates to trading and clearing of financial instruments. In particular, aspects of the invention relate to processing and clearing interest rate swaps.

BACKGROUND

Over-the-counter (OTC) products include financial instruments that are bought, sold, traded, exchanged, and/or swapped between counterparties. Many OTC derivatives exist to fill a wide range of needs for counterparties, including limiting or mitigating exposure to risks and/or maximizing cash flow. After an exchange of an OTC product, counterparties may expend resources managing the product for the duration of its life. Management may be complicated based on the number of exchanges and/or the specific terms of the contract.

An interest rate swap (IRS) is an example of a type of OTC product where the parties agree to exchange streams of future interest payments based on a specified principal or notional amount. Each stream may be referred to as a leg. Swaps are often used to hedge certain risks, for instance, interest rate risk. They can also be used for speculative purposes.

An example of a swap includes a plain fixed-to-floating, or "vanilla," interest rate swap. The vanilla swap includes an exchange of interest streams where one stream is based on a floating rate and the other interest stream is based on a fixed rate. In a vanilla swap, one party makes periodic interest payments to the other based on a variable interest rate. The variable rate may be linked to a periodically known or agreed upon rate for the term of the swap such as the London Interbank Offered Rate (LIBOR).

In return for the stream of payments based on the variable rate, the other party may receive periodic interest payments based on a fixed rate. The payments are calculated over the notional amount. The first rate is called variable, because it is reset at the beginning of each interest calculation period to the then current reference rate, such as LIBOR published rate. The parties to an IRS swap generally utilize these exchanges to limit, or manage, exposure to fluctuations in interest rates, or to obtain lower interest rates than would otherwise be unobtainable.

Usually, at least one of the legs to a swap has a variable rate. The variable rate may be based on any agreed upon factors such as a reference rate, the total return of a swap, an economic statistic, etc. Other examples of swaps include total return swaps, and Equity Swaps.

A total return swap (also known as total rate of return swap, or TRORS) is a swap where one party receives interest payments based on an underlying asset (plus any capital gains/losses) over the payment period, while the other receives a specified fixed or floating cash flow. The total return is the capital gain or loss, plus any interest or dividend payments. The specified fixed or floating cash flow is typically unrelated to the credit worthiness of the reference asset. The underlying asset may be any asset, index, or basket of assets. The parties gain exposure to the return of the underlying asset, without having to actually hold the asset. That is, one party gains the economic benefit of owning an asset without having the asset on its balance sheet, while the other (which does retain that asset on its balance sheet) has protection against a potential decline in its value. An equity swap is a variation of a total return swap. The underlying asset in an equity swap may be a stock, a basket of stocks, or a stock index.

The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment.

Currently, financial institutions such as banks trade interest rate payments and/or IRSs OTC. Steams of future payments must be valued to determine a current market price. The market value of a swap is the sum of the difference between the net present value (NPV) of the future fixed cash flows and the floating rate The mark-to-market value of an interest rate swap product is valued with reference to settlement pricing curves. In some cases, the settlement curve may be taken directly from a third party source, but in other cases, the settlement pricing curves may be algorithmically determined, for instance, by combining settlement pricing curves from multiple third party sources. The algorithm may employ simple averaging, but in other cases may employ weighted averaging and may incorporate other factors, some of which may represent subjective inputs. For these reasons, in many cases the determination of settlement values in a pricing curve is an inexact science.

In some cases, particularly when the settlement curve is derived algorithmically, the settlement curve may be "poorly behaved," that is, it may lead to nonsensical results when determining mark-to-market values. Specifically, in some cases the discount factors derivable from the settlement curve may be negative. It is deemed desirable to be able to evaluate a settlement curve to foresee and where possible avoid negative discount factors.

SUMMARY

It has been found that a settlement curve may be evaluated to determine whether discount factors derivable from the settlement curve would be negative. Based on this evaluation, various steps may be taken, these including, for instance, generating an error code or recalculating or restating the pertinent portions of the settlement curve.

In some embodiments, the invention provides a method that is useful in connection with providing discount factors for an exchange-traded mark-to-market derivative product that has a variable tick rate, such as an interest rate swap product. The inventive method may include providing a series of consecutive settlement values, which collectively represent a settlement value curve for the derivative product. The curve is evaluated by determining, for each consecutive pair of settlement values, whether the difference between the first settlement value in the pair and the second settlement value in the pair exceeds a threshold. The threshold represents the value at which a discount factor derived from said pair of settlement values would be negative.

When the difference between a pair of settlement values in the curve has been found to exceed the threshold, various steps may be taken, these including generating an error code or making an adjustment to the settlement curve, or both. The settlement curve may be adjusted, for instance, by adjusting the second settlement value to a predetermined number of basis points below the value at which the second settlement value would cause the difference between the first and second settlement values to exceed the threshold. Alternatively, the algorithm used to derive the settlement values may be adjusted so as to recalculate one or both of the settlement values.

In other embodiments, the invention encompasses an apparatus and a computer-readable medium. Generally, the apparatus comprises a display, a memory unit, and a processing unit coupled to the memory unit and configured to perform some or all of the steps described herein. The tangible computer-readable medium comprises computer-executable instructions for causing a computing device to perform some or all of the steps described herein.

BRIEF DESCRIPTION OF THE DRAWINGS

The present invention may take physical form in certain parts and steps, described in detail in the following description and illustrated in the accompanying drawings that form a part hereof, wherein.

DETAILED DESCRIPTION

Figure 1:
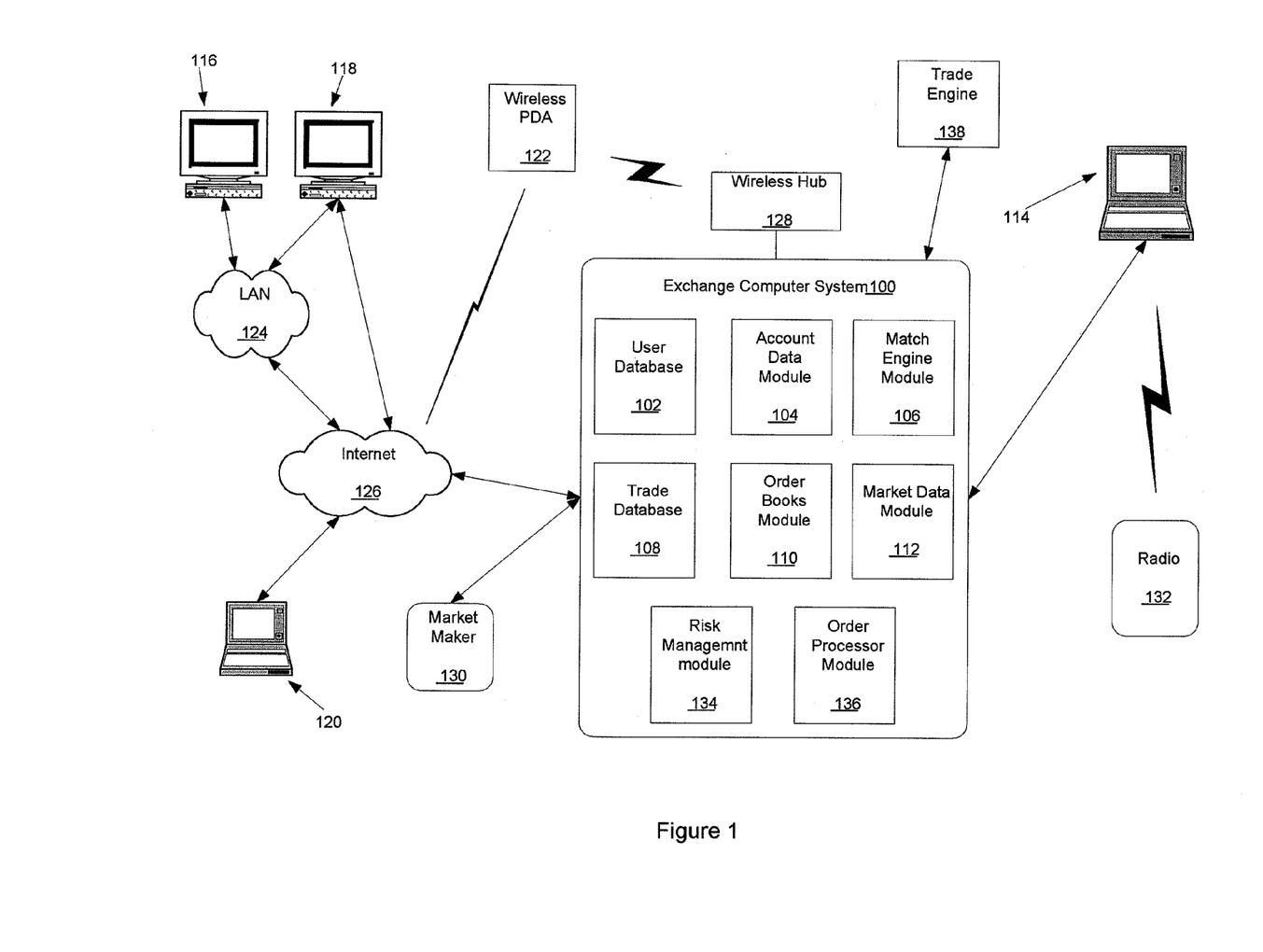
FIG. 1 illustrates an exemplary trading network environment for implementing trading systems and methods.

With reference to FIG. 1, an exchange computer system 100 receives orders and transmits market data related to orders and trades to users. Exchange computer system 100 may be implemented with one or more mainframe, servers, gateways, desktop, handheld and/or other computers. In one embodiment, a computer device uses a 64-bit (or more) processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card, such as an Ethernet card, or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

In accordance with various aspects of the invention, a clearinghouse may act as a guarantor of the agreement for the derivative. At least one benefit of an exchange traded derivative, as opposed to the OTC type, is that the derivative is cleared and guaranteed by the clearinghouse. This may promise more interesting capital efficiencies for institutions that may cross-margin one derivative against another derivative.

Additionally, the central clearinghouse typically allows the holder of a position to trade into or out of a position easily and in a standardized way.

In an aspect of the invention, upon execution of an IRS between parties, a clearing process may be initiated to process the cash flows resulting from the transaction. The clearing process may be initiated by, for example, the processing unit of a suitable module of the exchange computer system 100. Following the initial cash flow processing, the clearing process maintains the IRS swaps, now-guaranteed by the central clearing party, for its lifespan, e.g., 10 years. As the IRS positions for all parties may be standardized, the floating rate reset and payment processing may be simpler and easier to manage because there is only one floating rate reset and cash flow calendar per currency. The International Swaps and Derivatives Association (ISDA) day-count conventions, affect of holidays and other cash flow and reset related parameters may also be pre-selected.

The invention is contemplated to be useful in connection with any derivative, by which is contemplated any instrument whose value depends on an underlying value and including without limitation such derivatives as interest rate swaps, credit default or other swaps, options, forwards, and futures. Many such derivatives are exchange-traded and are valued on a mark-to-market basis. The Chicago Mercantile Exchange, the assignee of the present application, presently operates an exchange for interest rate swaps, and the invention is particularly contemplated to be useful in connection with such swaps. Interest rates swaps are described in more detail in copending application Ser. No. 11/950,117, entitled "Factorization of Interest Rate Swap Variation," published as U.S. Application Publication No. 2008-0249958 A1, and in application Ser. No. 12/021,568, entitled "Standardization and Management of Over-the-Counter Financial Instruments," published as U.S. Application Publication No. 2008-0183615 A1, both of which applications are hereby incorporated by reference in their entireties.

In particular, the swap exchange technology described in the foregoing applications can employ a variable tick rate. The tick rate is determined using a value known as the swap value factor (SVF), which is calculated to simplify the mark-to-market (MTM) variation calculation of a cleared interest rate swap. The SVF may include the swap's applicable discount factors and associated daycount fractions into a single factor, and may be considered as the sum of coupon value factors. The coupon value factors may be calculated for a coupon expiration date as the product of daycount fraction and swap discount factor. The SVF may be a function of interest rates derived from yield curves. Generally, the swap value factor is used to calculate a mark-to-market value over two consecutive market periods (which may be, for instance, sequential days or which may include multiple mark-to-market periods per trading day). The mark-to-market value is calculated as:

MTM=[(Settlement value$_T$)−(Settlement value$_{T-t}$)]
\*$SVF_T$\* SignedNotionalTradeValue This value is per a fixed number of currency units (typically 100,000 currency units, e.g., dollars or Euros), calculated at time "T" relative to time "T-t." In a mark-to-market exchange, "t" represents one settlement period, and thus time "T-t" is the immediately preceding settlement period. Positive notional amounts represent a buy, and negative notional amounts represent a sell.

For example, a clearinghouse or other entity may wish to calculate the MTM variation of a six month USD swap (i.e. a swap with two quarterly coupons—swap matures in September 2010) that commences on Mar. 19, 2010 with a notional swap value of $1,000,000. For this exemplary scenario, the current date is assumed to be Mar. 16, 2010 with an IMM start date of Mar. 19, 2010. The MTM variation of the swap maturing in September 2010 may be calculated as of the end of the day settlement on Mar. 16, 2010 relative to Mar. 15, 2010, end of day settlement. In this exemplary scenario, the Mar. 15, 2010 settlement value for the swap maturing in September 2010 is 5.38% and the Mar. 16, 2010 settlement value is 5.40%. The calculated number of days between the Mar. 19, 2010 (the next IMM date) start date and June 2010 coupon is 91 days. The calculated number of days between the June 2010 coupon and the September 2010 coupon is 92 days. The discount factors used to discount the September 2010 swap's coupon back to Mar. 15 and Mar. 16, 2010 along with the coupon daycounts are illustrated in the following table.

| Coupon | Days between coupons | Mar. 16, 2010 Discount Factor |
| --- | --- | --- |
| June 2010 | 91 | 0.9891 |
| September 2010 | 92 | 0.9775 |

The MTM of an interest rate swap on Mar. 16, 2010 (calculated at time "T" relative to time "T-t"), using a SVF at time "T" 204 may be calculated by applying the equation:

MTM=[(Settlement Value on Mar. 16, 2010)−(Settlement Value on Mar. 15, 2010)]\*(Swap Value Factor on Mar. 16, 2010)\*notional amount.

It is noted that the swap value factor on Mar. 15, 2010, the start of the settlement period, is not used in this calculation.

The swap value factor may itself be calculated via any suitable methodology. Generally, and as heretofore described in application Ser. Nos. 11/950,117 and 12/021,568, the swap value factor may be expressed as:

$$\sum_{i=1}^{n}(d_i - d_{i-1})/360 \times sf_i$$

where sf is the discount factor on d, at current date. Further details concerning the calculation and use of swap value factors can be found in the heretofore identified applications.

The swap value factor ordinarily is used to calculate mark-to-market settlements from settlement values. In practice, the settlement values may be subjected to an adjustment on the "roll" date of the swap, which occurs quarterly for dollar-denominated interest rate swaps and semiannually for Euro-denominated swaps. When this adjustment is made, an adjusted start of day price is used to value positions that have remained open during the roll.

In the pricing of interest rate swap products, settlement values generally are employed. More specifically, a settlement value curve provides a snapshot of settlement values at a given settlement date. The curve represents a series of settlement values as a function of swap tenors. The settlement values in the settlement value curve may be obtained and set nominally by a third party, wherein the information used to derive the points on the curve is abstracted. In accordance with some embodiments of the invention, the settlement values may be derived algorithmically and in some instances may be derived algorithmically from a plurality of third party nominally stated settlement values. The algorithm may be as simple as averaging a plurality of settlement values to represent points on the settlement value curve, but in practice more complex algorithms, such as weighted average algorithms or algorithms that incorporate other subjective or objective factors may be employed. From the settlement values, discount factors may be derived, and from the discount factors, a swap value factor may be determined. The swap value factor is used to calculate the net present value of the fixed leg of the swap, and this value is used to determine the mark-to-market variation calculation for a given swap. Further details concerning the derivation of discount factors and swap value factors are set forth in the heretofore identified application Ser. Nos. 11/950,117 and 12/021,568

Figure 2:
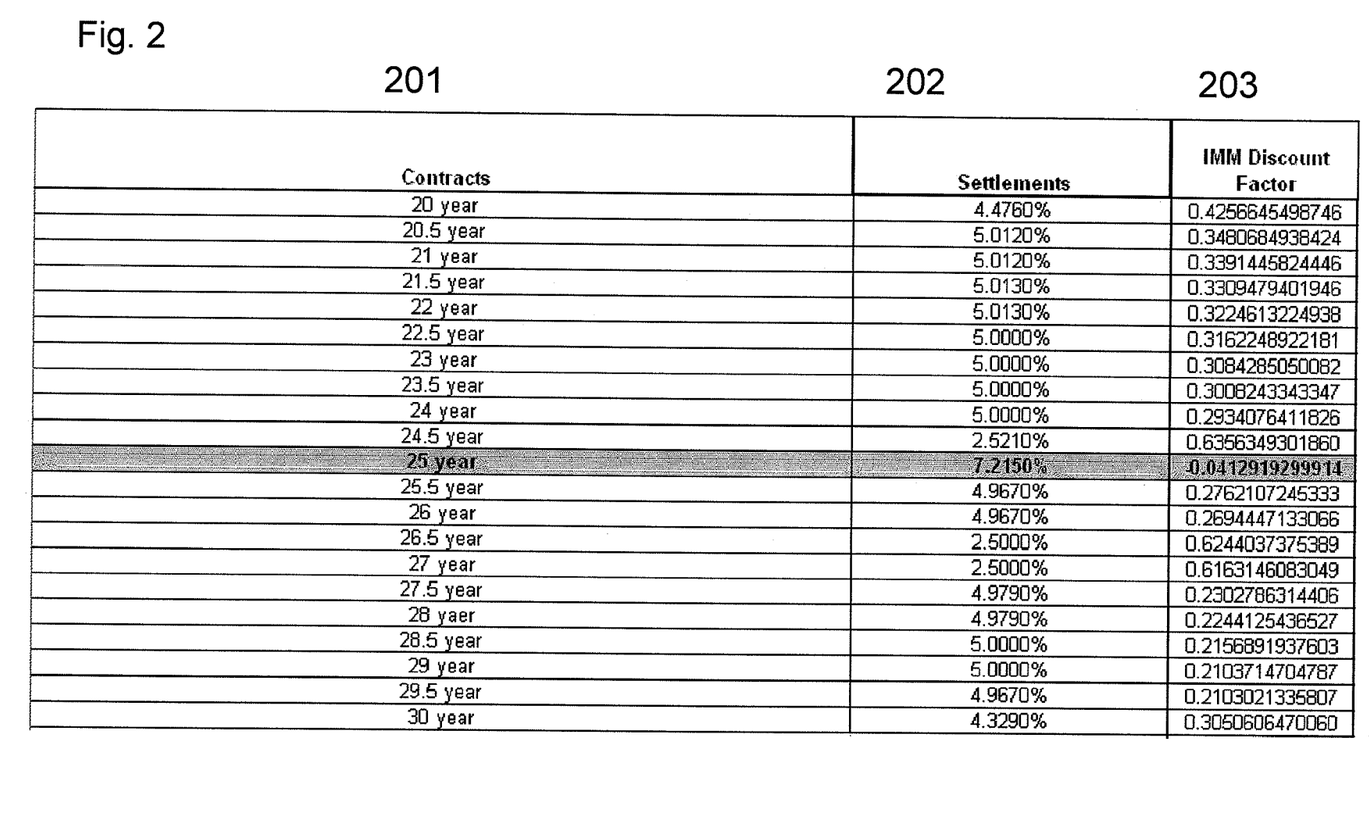
FIG. 2 is a table that represents an exemplary settlement curve as derived algorithmically from multiple third party sources, and discount factors derivable from the curve.

With reference to FIG. 2, for instance, the swap value curve is defined by predetermined settlement periods for the contracts 201, representing contract positions at 20 years, 20.5 years, 21 years, and so forth up to 30 years, and settlement values 202, which represent interest rate pricing for each contract period. As depicted, the settlement values stated are theoretically exemplary of settlement values that are algorithmically derived from a plurality of sources in conjunction with subjective and objective factors. The underlying algorithms for determination of the settlement values are subject to change and refinement, on a daily or more frequent basis if desired. Such algorithms are not a part of the present invention.

Beginning with the first pair of settlement values, i.e., those for the 20 and 20.5 year contracts, a calculation is made to determine whether the difference between these two values (5.0120% and 4.4760% respectively) exceeds a threshold. This is repeated for the next pair of values (5.0120% and 5.0120% for the 20.5 and 21 year contracts respectively) and so on until the end of the contract period.

The inventors have calculated that the threshold may be derived in accordance with the following equation.

$$SV_n < 1/[SVF_{n-1}*(1+(r*s/360)]$$

wherein $SV_n$ is the settlement value of the swap contract at the nth period, $SVF_{n-1}$ is a swap factor value of the immediately preceding swap contract, r is the start-of-day OIS rate used to discount to spot date from the next predetermined start date, and s is the number of days between spot and the next predetermined start date. The amount by which the settlement value is beneath the threshold can assist in determining the magnitude of the desired adjustment to the settlement value.

For the 20 and 20.5 year contact settlement values, the difference does not exceed the threshold as determined by this equation, and hence no adjustment to either settlement value is needed. This process is repeated with the next pair of settlement values (the 21 year value at 5.0120% and the 20.5 year value, also at 5.0120%), and sequentially with each pair of values thereafter.

At the 25 year settlement value, the difference between this value and the preceding 24.5 year settlement value is sufficiently large that the settlement curve is "poorly behaved," that is, the discount factor (reflected in column 203) that would be calculated from the settlement values is negative. In practice, the discount factors may be calculated after calculation and posting of settlement values, so it is desirable to correct the settlement value curve prior to calculation of discount factors.

Figure 3:
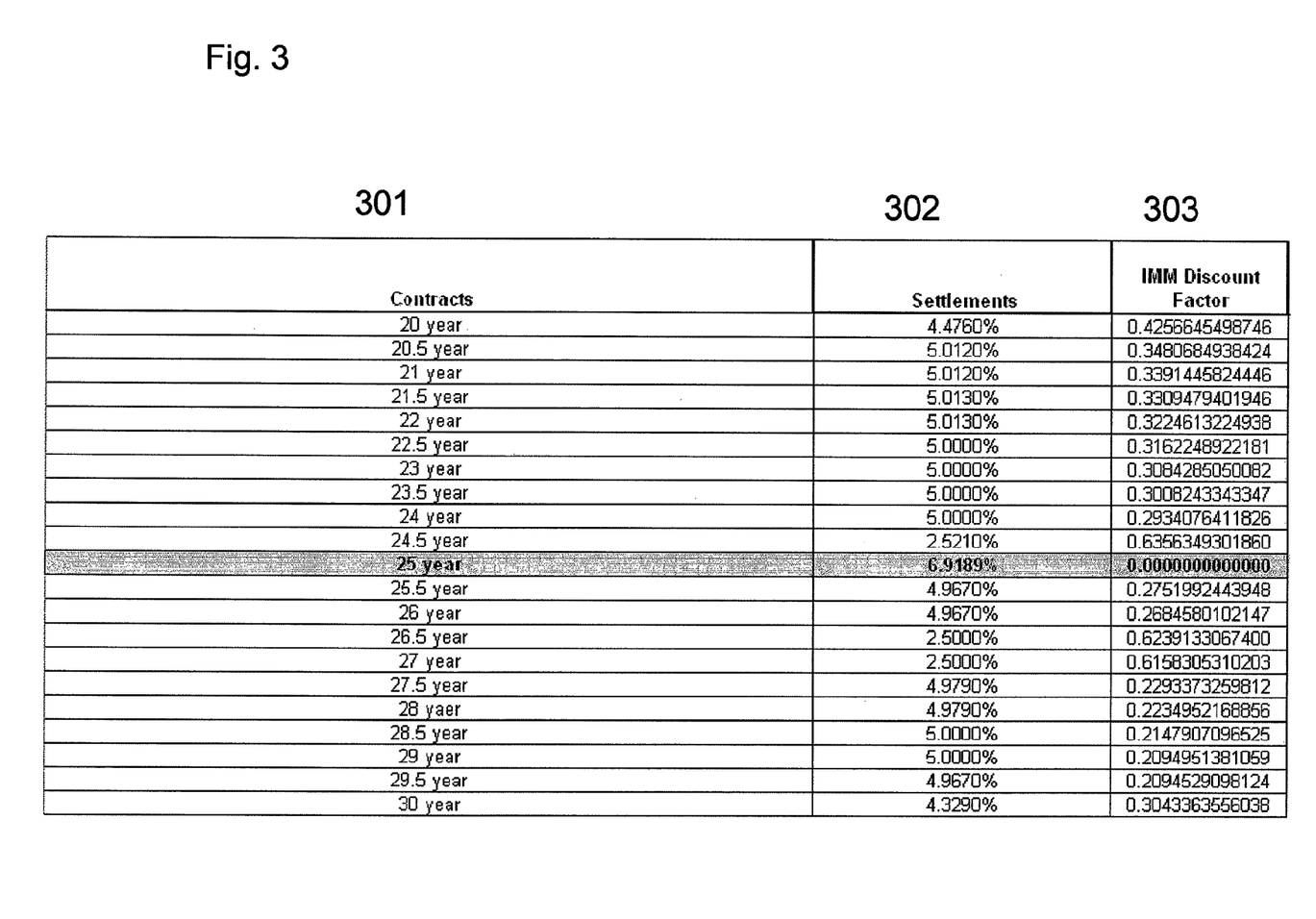
FIG. 3 is a table that represents the exemplary settlement curve of FIG. 2 as modified to adjust the settlement associated with the 25-year term point below the threshold value, and discount factors derivable from the curve.

In this data set, r was 0.0517164857103012 (expressed in decimal form), s was 149, and $SVF_{n-1}$ was 14.15031027. Using the foregoing equation, the settlement value of the 25 year contract at which the threshold is not exceeded is found to be 6.9189%. Relative to the 24.5 year contact settlement, this is a jump of 440 basis points, which in this instance is calculated as being a safe limit. As seen in FIG. 3, with respect to a settlement curve defined by contracts 301 and settlement values 302, the discount factor reflected in 303 zero at this point. It is seen that the 25 year settlement value must be below 6.9189% if the curve is to be well-behaved (and if no change is made to the 24.5 year settlement value).

In the course of carrying out the heretofore-described sequence of calculations, an error code may be generated when a poorly behaved settlement curve is discovered. Alternatively, or in addition thereto, new settlement values may be substituted for one or both of the pair of settlement values. For example, the algorithm may be adjusted to arrive at a new settlement value for one or both of the settlement values at the point at which the settlement curve becomes poorly behaved. Alternatively one or both of these pair of settlement values may be adjusted by adding or subtracting a predetermined number of basis points (e.g. 10, 20, 50, or 100 basis points). In many embodiments, it will be desired to make an adjustment to the second of the pair of settlement values, because it is possible that an adjustment to the first of the pair of settlement values will introduce poor behavior in the settlement value curve in a range previously found to be well behaved.

Figure 4:
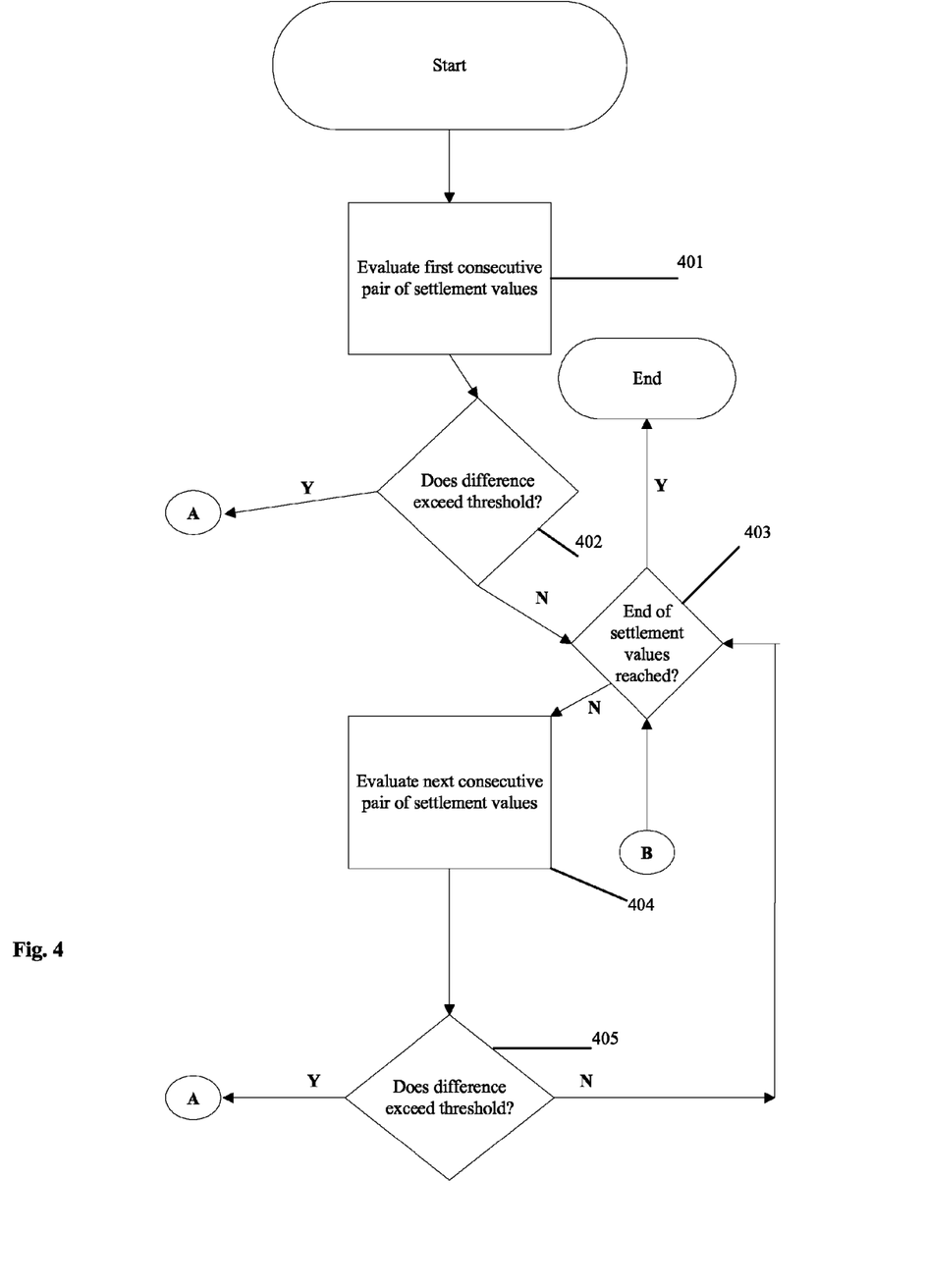
FIGS. 4 and 4A collectively are a single integrated flowchart that represents steps in a method for evaluating a settlement curve.
Figure 4A:
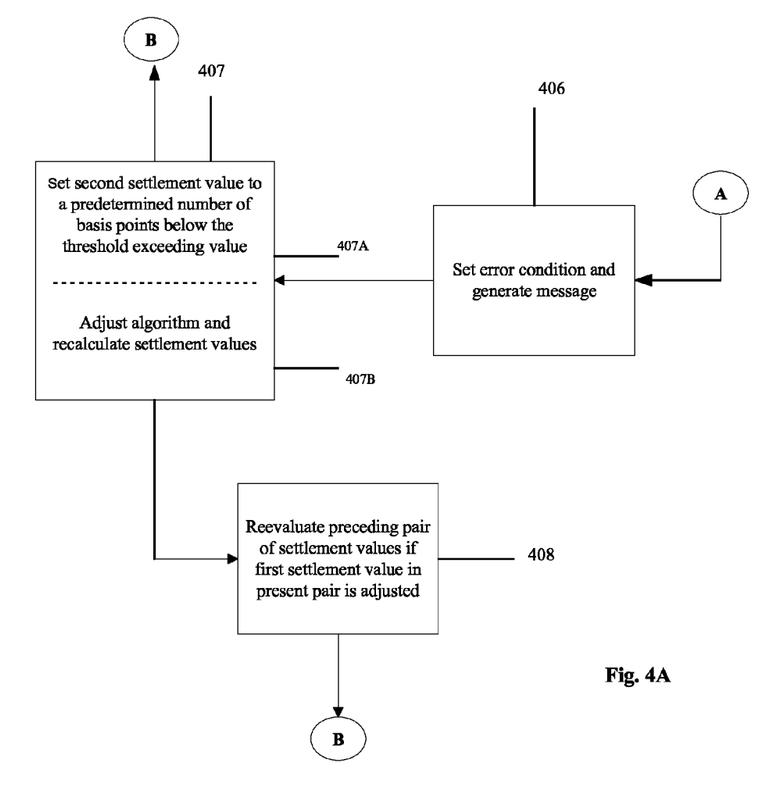

Generally, some embodiments of the inventive method may be illustrated with reference to the method outlined in FIGS. 4 and 4A. In carrying out the invention, it is envisioned that steps may be added or removed as appropriate. With reference to these Figures, at step 401 the first consecutive pair of settlement values in a settlement value curve is evaluated in accordance with the heretofore referenced equation. If, in step 402, the difference between the first and second pair of settlement values is found not to exceed the threshold, control passes to step 403, where it is determined whether the last settlement value in the settlement value curve has been reached. If so, the programmer routine ends; if not, control passes to step 404 where the next pair of settlement values is evaluated and, at step 405, an inquiry is made as to whether the difference exceed the threshold. Provided the answer is negative, control passes back to step 403 and the process repeats from this point.

If, at steps 402 or 405 it is found that the difference between a pair of settlement values exceeds the threshold, control passes to step 406, where an error condition is set and an error message generated. Subsequently, at step 407 additional actions are taken. Steps 406 and 407 are both performed in conjunction with this embodiment of this invention, but it is contemplated that either step may be omitted. Step 407 represents one of two optionally alternative steps, 407A and 407B. At step 407A, the first option is to reset the second settlement value to a predetermined number of basis points below the value at which the settlement value could cause the difference between the pair of settlement values to exceed the threshold. From here, control returns to step 403, and the process continues from this point. In step 407B, the second alternative is to adjust the algorithm and recalculate one or both of first or second pair of settlement values. This may involve, for instance, adjusting weighting factors in the algorithm used to derived the settlement value curve, or adjusting any subjective factors that go into the determination of the settlement value curve. If the first of the pair of settlement values is adjusted, the preceding pair of settlement values then is evaluated in step 408 to insure that the adjustment to the first settlement value (which is the second settlement value in the preceding pair) has not introduced an instance of poor behavior into the settlement value curve. Additional like steps (not shown) may be performed to introduce corrections to earlier settlement values as may be necessary. When complete, control then returns to step 403 for a continuation of the process as before.

The invention in some embodiments may be regarded as a method for performing the steps described therein. In other embodiments, the invention may be embodied as an apparatus that comprises a display, a memory unit, and a processing unit coupled to the memory unit and configured to perform the steps described herein. In other embodiments, the invention may be embodied as a tangible computer-readable medium that contains computer-executable instructions for causing a computing device to perform steps described herein.

It is thus seen that a settlement value curve may be evaluated for poor behavior and corrected in such case.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A method for evaluating a settlement value curve for an interest rate swap product, the settlement value curve representing a series of settlement values for plural consecutive settlement periods for said swap product, the settlement values being derived from a settlement value algorithm, the method comprising:
   for each consecutive pair of the settlement values, determining, by a processing unit, whether the difference between a first settlement value in the pair and a second settlement value in the pair exceeds a threshold, the threshold representing the value at which a discount factor derived from said pair of settlement values would be negative; and
   adjusting one or both of the first and second settlement values in response to determining that said difference in settlement values exceeds said threshold.

2. A method according to claim 1, said interest rate swap product being a dollar-denominated product.

3. A method according to claim 1, said interest rate swap product being a Euro-denominated product.

4. A method according to claim 1, comprising:
   adjusting the second settlement value to a predetermined number of basis points below the value at which the second settlement value would cause the difference between the first and second settlement values to exceed the threshold.

5. A method according to claim 1, comprising:
   adjusting an algorithm used to derive the settlement values so as to recalculate at least one of said settlement values.

6. A method comprising:
   for an exchange-traded mark-to-market derivative product having a variable tick rate, providing a series of consecutive settlement values; and
   for each consecutive pair of the settlement values, determining, by a processing unit, whether the difference between a first settlement value in the pair and a second settlement value in the pair exceeds a threshold, the threshold representing the value at which a discount factor derived from said pair of settlement values would be negative.

7. A method according to claim 6, comprising adjusting one or both of the first and second settlement values if said difference in settlement values exceeds said threshold.

8. A method according to claim 7, comprising adjusting the second settlement value to a predetermined number of basis points below the value at which the second settlement value would cause the difference between the first and second settlement values to exceed the threshold.

9. A method according to claim 7, comprising:
   adjusting an algorithm used to derive the settlement values so as to recalculate at least one of said settlement values.

10. A method according to claim 9, said algorithm incorporating plural third party settlement curves.

11. A method according to claim 6, comprising generating an error code if said difference in settlement values exceeds said threshold.

12. A method according to claim 6, said derivative product being a forward-starting interest rate swap product defined in relation to a series of predetermined start dates.

13. A method according to claim 12, said threshold being determined by determining whether the second settlement value in the pair satisfies the equation:

$$SV_n < 1/[SVF_{n-1} * (1+(r*s/360))]$$

wherein $SV_n$ is the settlement value of the swap contract at the nth period, $SVF_{n-1}$ is a swap value factor of the immediately preceding swap contract, r is the start-of-day OIS rate used to discount to spot date from the next predetermined start date, and s is the number of days between spot and the next predetermined start date.

14. An apparatus comprising:
   a memory unit storing instructions, and
   a processing unit coupled to the memory unit, wherein the instructions, when executed, cause the apparatus at least to:
      for an exchange-traded mark-to-market derivative product having a variable tick rate, provide a series of consecutive settlement values; and
      for each consecutive pair of settlement values, determine whether the difference between a first settlement value in the pair and a second settlement value in the pair exceeds a threshold, the threshold representing the value at which a discount factor derived from said pair of settlement values would be negative.

15. An apparatus according to claim 14, said apparatus configured to adjust one or both of the first and second settlement values if said difference in settlement values exceeds said threshold.

16. An apparatus according to claim 15, said apparatus configured to adjust the second settlement value to a predetermined number of basis points below the value at which the second settlement value would cause the difference between the first and second settlement values to exceed the threshold.

17. An apparatus according to claim 15, said apparatus configured to adjust an algorithm used to derive the settlement values so as to recalculate at least one of said settlement values.

18. An apparatus according to claim 17, said algorithm incorporating plural third party settlement curves.

19. An apparatus according to claim 14, said apparatus configured to generate an error code if said difference in settlement values exceeds said threshold.

20. An apparatus according to claim 14, said derivative product being a forward-starting interest rate swap product defined in relation to a series of predetermined start dates.

21. An apparatus according to claim 20, said threshold being determined by determining whether the second settlement value in the pair satisfies the equation:

$$SV_n < 1/[SVF_{n-1} * (1+(r*s/360)]$$

wherein $SV_n$ is the settlement value of the swap contract at the nth period, $SVF_{n-1}$ is a swap value factor of the immediately preceding swap contract, r is the start-of-day OIS rate used to discount to spot date from the next predetermined start date, and s is the number of days between spot and the next predetermined start date.

22. A memory containing computer-executable instructions for causing a computing device to perform steps comprising:

for an exchange-traded mark-to-market derivative product having a variable tick rate, providing a series of consecutive settlement values; and for each consecutive pair of the settlement values, determining whether the difference between a first settlement value in the pair and a second settlement value in the pair exceeds a threshold, the threshold representing the value at which a discount factor derived from said pair of settlement values would be negative.

23. A memory according to claim 22, wherein the instructions, when executed, cause the computing device to cause an adjustment to one or both of the first and second settlement values if said difference in settlement values exceeds said threshold.

24. A memory according to claim 23, wherein the instructions, when executed, cause the computing device to cause an adjustment to the second settlement value to a predetermined number of basis points below the value at which the second settlement value would cause the difference between the first and second settlement values to exceed the threshold.

25. A memory according to claim 23, wherein the instructions, when executed, cause the computing device to cause an adjustment to an algorithm used to derive the settlement values so as to recalculate at least one of said settlement values.

26. A memory according to claim 25, said algorithm incorporating plural third party settlement curves.

27. A memory according to claim 22, wherein the instructions, when executed, cause the computing device to generate an error code if said difference in settlement values exceeds said threshold.

28. A memory according to claim 22, said derivative product being a forward-starting interest rate swap product defined in relation to a series of predetermined start dates.

29. A memory according to claim 28, said threshold being determined by determining whether the second settlement value in the pair satisfies the equation:

$$SV_n < 1/[SVF_{n-1} * (1+(r*s/360)]$$

wherein $SV_n$ is the settlement value of the swap contract at the nth period, $SVF_{n-1}$ is a swap value factor of the immediately preceding swap contract, r is the start-of-day OIS rate used to discount to spot date from the next predetermined start date, and s is the number of days between spot and the next predetermined start date.

* * * * *